United States Patent
Kang et al.

(10) Patent No.: US 9,173,130 B2
(45) Date of Patent: Oct. 27, 2015

(54) CHANNEL STATUS INFORMATION FEEDBACK METHOD AND APPARATUS IN MULTI-NODE SYSTEM

(75) Inventors: Ji Won Kang, Anyang-si (KR); Bin Chul Ihm, Anyang-si (KR); Su Nam Kim, Anyang-si (KR); Jin Young Chun, Anyang-si (KR); Sung Ho Park, Anyang-si (KR); Ki Tae Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 82 days.

(21) Appl. No.: 13/982,027

(22) PCT Filed: Dec. 16, 2011

(86) PCT No.: PCT/KR2011/009719
§ 371 (c)(1),
(2), (4) Date: Jul. 26, 2013

(87) PCT Pub. No.: WO2012/102483
PCT Pub. Date: Aug. 2, 2012

(65) Prior Publication Data
US 2013/0308542 A1    Nov. 21, 2013

Related U.S. Application Data

(60) Provisional application No. 61/436,985, filed on Jan. 27, 2011.

(51) Int. Cl.
*H04Q 7/00*    (2006.01)
*H04W 28/06*    (2009.01)
(Continued)

(52) U.S. Cl.
CPC ............. *H04W 28/06* (2013.01); *H04B 7/024* (2013.01); *H04B 7/0478* (2013.01); *H04B 7/066* (2013.01);
(Continued)

(58) Field of Classification Search
None
See application file for complete search history.

(56) References Cited

U.S. PATENT DOCUMENTS

| | | |
|---|---|---|
| 2011/0249665 A1 | 10/2011 | Seyama et al. |
| 2012/0033571 A1 | 2/2012 | Shimezawa et al. |

(Continued)

FOREIGN PATENT DOCUMENTS

| | | |
|---|---|---|
| JP | 2012-531802 A | 12/2012 |
| WO | WO 2010/013950 A2 | 2/2010 |

(Continued)

OTHER PUBLICATIONS

IEEE Std. 802.16m-2011, "IEEE Standard for Local and metropolitan area networks—Part 16: Air Interface for Broadband Wireless Access Systems Amendment 3: Advanced Air Interface", Amendment to IEEE STD 802.16-2009, May 6, 2011, pp. 894-896.

(Continued)

*Primary Examiner* — Duc C Ho
(74) *Attorney, Agent, or Firm* — Birch, Stewart, Kolasch & Birch, LLP

(57) ABSTRACT

Provided is a channel status information feedback method and apparatus of a terminal in a multi-node system, including a plurality of nodes and a base station which is connected to and can control each of the plurality of nodes. The method comprises the steps of: obtaining one precoding matrix index (PMI) for each cooperative node with respect to the entire target frequency band; obtaining a phase correction value to be applied to the PMI for said each cooperative node in each subband within the target frequency band; and feeding the calculated PMI and phase correction value back to the serving node.

20 Claims, 6 Drawing Sheets

(51) Int. Cl.
*H04B 7/02* (2006.01)
*H04L 5/00* (2006.01)
*H04L 25/03* (2006.01)
*H04B 7/04* (2006.01)
*H04B 7/06* (2006.01)

(52) U.S. Cl.
CPC ............ *H04L 5/0035* (2013.01); *H04L 5/0091* (2013.01); *H04L 25/03904* (2013.01); *H04B 7/0639* (2013.01)

(56) References Cited

U.S. PATENT DOCUMENTS

| | | | |
|---|---|---|---|
| 2012/0082148 A1* | 4/2012 | Sperling et al. | 370/338 |
| 2012/0099513 A1 | 4/2012 | Suh et al. | |
| 2012/0106388 A1* | 5/2012 | Shimezawa et al. | 370/252 |
| 2012/0213310 A1 | 8/2012 | Ko et al. | |

FOREIGN PATENT DOCUMENTS

| | | |
|---|---|---|
| WO | WO 2010/076854 A1 | 7/2010 |
| WO | WO 2010/122818 A1 | 10/2010 |
| WO | WO 2010/114269 A2 | 12/2010 |

OTHER PUBLICATIONS

IEEE P802.16m/D4, "Draft Amendment to IEEE Standard for Local and metropolitan area networks—Part 16: Air Interface for Fixed and Mobile Broadband Wireless Access Systems," Feb. 2010.

Loa K. et al., "Comment on Control Parameters for DL Multi-BS Joint Processing in IEEE P802.16m/D4 (16.5.1 3.1)," IEEE C80216m-10/0204, Mar. 5, 2010, pp. 1-3.

Pantech, "Enhanced UL and DL transmission for CoMP," 3GPP TSG RAN1 #63bis, R1-110162, Dublin, Ireland, Jan. 17-21, 2011.

IEEE PS02 16m/D9, "Draft Amendment to IEEE Standard for Local and metropolitan area networks Part 16; Air Interface for Broadband Wireless Access Systems Advanced Air Interface", Oct. 6, 2010, 10 pages.

* cited by examiner

CHANNEL STATUS INFORMATION FEEDBACK METHOD AND APPARATUS IN MULTI-NODE SYSTEM

CROSS-REFERENCE TO RELATED APPLICATIONS

This application is the National Phase of PCT/KR2011/009719 filed on Dec. 16, 2011, which claims priority under 35 U.S.C. 119(e) to U.S. Provisional Application No. 61/436,985 filed on Jan. 27, 2011, all of which are hereby expressly incorporated by reference into the present application.

TECHNICAL FIELD

The present invention relates to wireless communications, and more specifically, to a method and apparatus of feeding back channel status information in a multi-node system.

BACKGROUND ART

Recently, the amount of data transmitted over a wireless communication network is swiftly increasing because various devices appear and spread which require high data transmission and machine-to-machine communication, such as smart phones or tablet PCs. There are attention attracting technologies such as cognitive radio (CR) technology and carrier aggregation (CA) for effectively using more frequency bands, multi-antenna technology for raising data volume within a limited frequency.

Further, wireless communication networks are evolving such that the density of accessible nodes around users increases. Here, the "nodes" means antennas or antenna groups that are spaced apart from each other at a predetermined interval or more in a distributed antenna system (DAS), however is not limited thereto and rather may have a broader meaning. That is, the node may be a macro base station, a picocell base station (PeNB), a home base station (HeNB), an RRH (remote radio head), an RRU (remote radio unit), a relay station, and a distributed antenna (group). The higher density of nodes a wireless communication system has, the higher system performance the wireless communication system may show due to inter-node cooperation. That is, than when each node operates without cooperation with an independent base station, when each node is managed by a control station in light of transmission and reception and is operated as an antenna or antenna group for one cell, even better system performance may be achieved. Hereinafter, a wireless communication system including a plurality of nodes is referred to as a multi-node system.

Inter-node cooperated transmission (CoMP) may apply to such multi-node system. The cooperated transmission means a transmission scheme in which a plurality of nodes attends signal transmission and reception for the same terminal. The cooperated transmission schemes include joint processing and scheduling coordination. The joint processing refers to a scheme in which a plurality of nodes simultaneously participates in signal transmission and reception and includes JT (joint transmission) and DCS (dynamic cell selection). The scheduling coordination refers is to a scheme in which a plurality of nodes participates in signal transmission and reception for the same terminal at different times by scheduling and includes CS (coordinated scheduling) and CB (coordinated beamforming).

In case such cooperated transmission is applied to multi-node systems, there is a need for a method of feeding back channel status information of the terminal.

DISCLOSURE

Technical Problem

A channel status information feedback method and apparatus are provided in a multi-node system.

Technical Solution

According to an aspect of the present invention, there is provided a method of feeding back channel status information of a terminal in a multi-node system including a plurality of nodes and a base station connected to each of the plurality of nodes and able to control the plurality of nodes. The method comprises obtaining a precoding matrix index (PMI) for each cooperative node over an entire target frequency band, obtaining a phase correction value to be applied to the PMI for each cooperative node in each subband of the target frequency band, and feeding back the obtained PMI and the phase correction value to a serving node.

The target frequency band may be the entire system band of the multi-node system.

The phase correction value to be applied to the PMI for each cooperative node may be information used for forming one precoding matrix by connecting PM's for two or more different cooperative nodes.

The method further comprises receiving target frequency band information from the serving node, wherein the target frequency band information may indicate the target frequency band.

The target frequency band information may indicate a partial frequency band of the entire system band as the target frequency band.

In a case where the number of subbands in the target frequency band is N, the phase correction value to be applied to the PMI for each cooperative node may be N or less, wherein N is a natural number that is two or more.

Instead of the phase correction value to be applied to the PMI for each cooperative node, a difference value between a time of receiving a signal transmitted from a reference node that is one of the plurality of nodes and a time of receiving a signal transmitted from each cooperative node may be obtained and fed back.

Only one difference value may be fed back for the target frequency band

The difference value may be given as an index corresponding to each of a plurality of predetermined time sections.

The method may further comprise receiving a reference signal from the serving node and each cooperative node.

The PMI for each cooperative node and the phase correction value may be obtained by measuring the reference signal.

According to another aspect of the present invention, there is provided a terminal comprising an RF unit transmitting and receiving a wireless signal and a processor connected with the RF unit, wherein the processor obtains a precoding matrix index (PMI) for each cooperative node over an entire target frequency band, obtains a phase correction value to be applied to the PMI for each cooperative node in each subband of the target frequency band, and feeds back the obtained PMI and the phase correction value to a serving node.

Advantageous Effects

When cooperated transmission is applied in a multi-node system, the amount of channel status information fed back by a terminal may be reduced. Thus, feedback overhead of the terminal may be decreased.

MODE FOR INVENTION

The following technology may be used for various multiple access schemes such as CDMA (code division multiple access), FDMA (frequency division multiple access), TDMA (time division multiple access), OFDMA (orthogonal frequency division multiple access), and SC-FDMA (single carrier-frequency division multiple access). CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE (Institute of Electrical and Electronics Engineers) 802.11 (Wi-Fi), IEEE 802.16 (WiMAX), IEEE 802.20, E-UTRA (Evolved UTRA). UTRA is part of UMTS (Universal Mobile Telecommunications System). 3GPP (3rd Generation Partnership Project) LTE (Long Term Evolution) is part of E-UMTS (Evolved UMTS) using E-UTRA, and adopts OFDMA for downlink and SC-FDMA for uplink. LTE-A (Advanced) is a subsequent system of LTE. IEEE 802.16m is a subsequent system of IEEE 802.16e.

Figure 1:
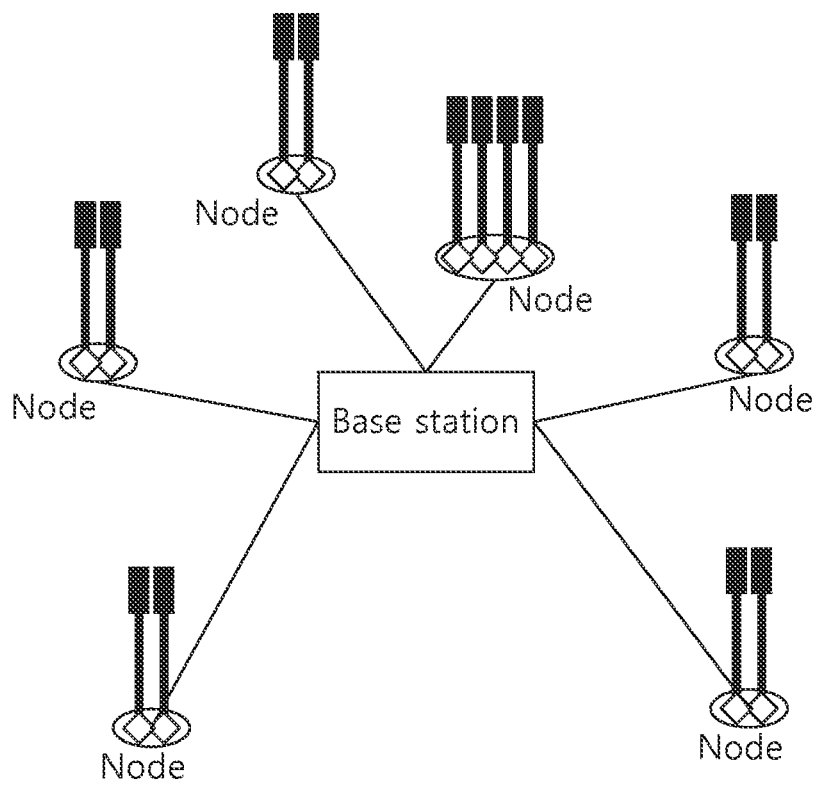
FIG. 1 illustrates an example of a multi-node system.

FIG. 1 shows an example of a multi-node system.

The multi-node system includes a base station (BS) and a plurality of nodes.

The base station provides a communication service to a specific geographical area. The base station generally refers to a fixed station that communicates with a terminal and may be referred to by other terms such as eNB (evolved-NodeB), BTS (Base Transceiver System), or ABS (advanced base station).

FIG. 1 illustrates distributed antennas as an example of the nodes, and in this sense, the nodes may be referred to as antenna nodes (ANs). However, the nodes are not limited to the distributed antennas, and may be implemented as, e.g., macro base stations, pico cell base stations (PeNBs), home base stations (HeNBs), RRHs (remote radio heads), or relay stations. The node may also be referred to as points. Such nodes are connected to the base station wiredly or wirelessly and may be controlled/managed by the base station.

In light of the terminal, each node may be identified or indicated through a reference signal (RS) or a pilot signal. The reference signal (or pilot signal, the same applies hereinafter) is a signal that is known to a transmission end and a reception end and means a signal used for channel measurement and data demodulation. The reference signal includes, e.g., CSI-RS (channel status indication-reference signal) as specified in the 3GPP LTE-A and preamble or midamble as specified in the IEEE 802.16m. Such reference signal or configuration for the reference signal may be mapped to each node (or transmission antenna of each node). If the mapping information between the chroma signal configuration and the node is given to the terminal or is previously known to the terminal, the terminal may identify or indicate the node based on the CSI-RS configuration and may obtain the channel status information for the node. The reference signal configuration may include information on configuration indexes, the number of antenna ports of each node, resource elements (REs) used, and transmission period and transmission time offset. Accordingly, for ease of description, as used herein, the technology of the terminal measuring a signal for a specific node or generating channel status information thereof may mean that the signal for the specific reference signal is measured or the channel status information is generated from the terminal's point of view.

Referring back to FIG. 1, the nodes are wiredly/wirelessly connected with the base station, and each node may be constituted of one antenna or a plurality of antennas (i.e., an antenna group). Antennas included in one node may be geographically located within a few meters and thus may show the same characteristics. In the multi-node system, each node serves as an access point (AP) to which the terminal may gain access.

As described above, in case each node includes antenna(s), such multi-node system is also referred to as a distributed antenna system (DAS). That is, the distributed antenna system means a system in which antennas (i.e., nodes) are dispersed at geographically various positions and the antennas are managed by a base station. The distributed antenna system differs from the conventional centralized antenna system (CAS) in which antennas of a base station are densely positioned at the center of the cell.

Here, the "antennas are geographically dispersed and arranged" may mean that, in case one receiver receives the same signal from a plurality of antennas, the antennas may be arranged so that a difference in channel status between each antenna and the receiver is a certain value or more. The "antennas are arranged in a centralized manner" may mean that the antennas are arranged so that a difference in channel status between each antenna and the receiver is less than the certain value. The certain value may be variously determined depending on the frequency used by the antennas or service types.

Figure 2:
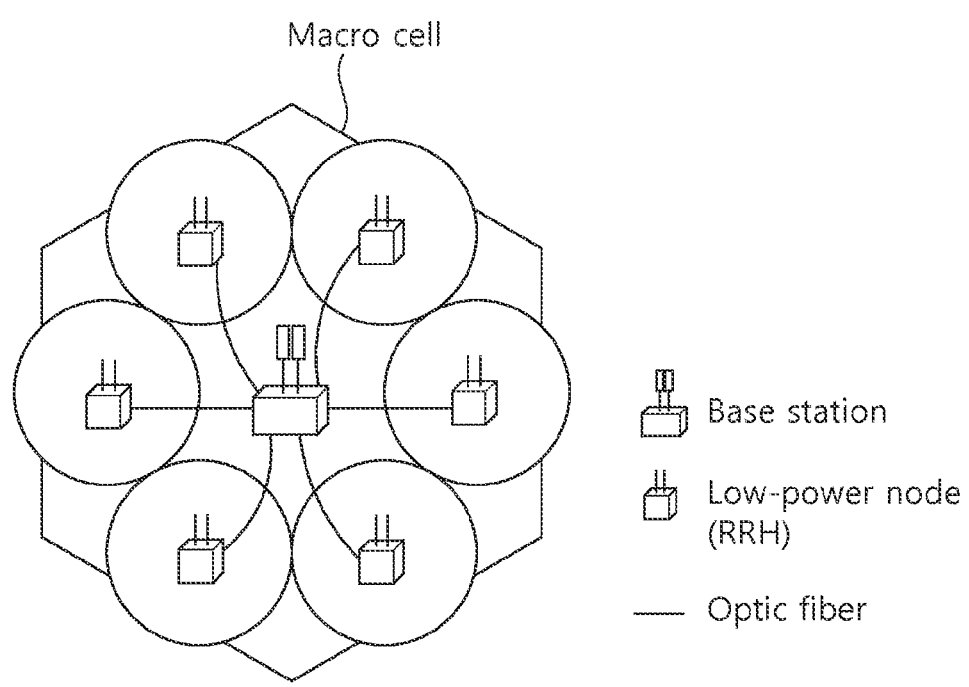
FIG. 2 illustrates an example of the configuration of a multi-node system.

FIG. 2 illustrates an example of the configuration of a multi-node system.

Referring to FIG. 2, the multi-node system may have the form in which a plurality of nodes are arranged in a macro cell where a base station provides services. That is, the multi-node system may be in the form of a heterogeneous network where a plurality of nodes having low transmission power belongs to the coverage of the macro cell having high transmission power. At this time, each node may have a difference cell ID from the macro cell (i.e., base station) or may have the same cell ID. In case each node has the same cell ID as the base station, the multi-node system may be referred to as a single cell multi-node system. The cell ID may be used as a seed number when the sync signal or reference signal is transmitted, and the terminal may identify the cell ID of each node through the sync signal or reference signal.

Figure 3:
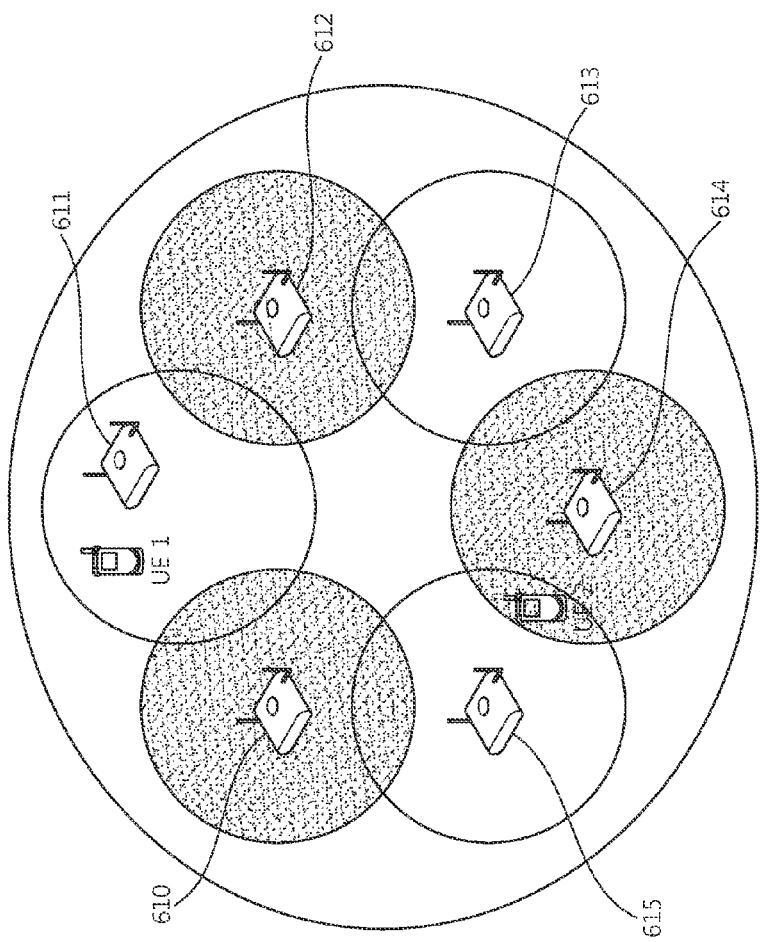
FIG. 3 illustrates another example of the configuration of a multi-node system.

FIG. 3 illustrates another example of the configuration of a multi-node system.

Referring to FIG. 3, the multi-node system allocates a common cell ID to each node, so that all of the nodes may transmit signals generated using the same cell ID.

Further, each node may be implemented as a virtual cell. Here, the "virtual cell" means an apparatus that is not recognized as an independent cell or antenna (port) by a legacy terminal but may be recognized as an independent cell or antenna (port) by an advanced terminal.

For example, each node 610 to 615 in the multi-node system may generate necessary information using the common cell ID and then may transmit it. Here, the necessary information may include system information and information relating to inter-cell shift, i.e., cell selection/reselection or handover. Then, both the legacy terminal and the advanced terminal may receive the necessary information like in the conventional method, and the legacy terminal recognizes each node as the same cell. The same cell recognized by the legacy terminal is referred to as a mother cell. Of course, the advanced terminal may also recognize the mother cell.

Meanwhile, each node 610 to 615 in the multi-node system may have a dedicated cell ID in addition to the common cell ID. The dedicated cell ID may be a value generated independently from the common cell ID or a value generated by establishing a specific relationship with the common cell ID. Each node 610 to 615 may generate and transmit a signal that is transmitted over a channel other than a channel over which the pilot signal or the necessary information is transmitted. Such signal may be recognized only by the advanced terminal. As such, the cell that may be recognized only by the advanced terminal is the virtual cell. Virtual cells may be recognized as cooperating cells in cooperated transmission for the advanced terminal.

Hereinafter, for ease of description, the multi-node system in which nodes are implemented as virtual cells is briefly referred to as a virtual cell system. The virtual cell system may perform cooperated transmission in order to reduce interference between virtual cells or between the mother cell and each virtual cell or in order to enhance system performance.

The cooperated transmission generally requires the terminal to feed back channel status information. The fed-back channel status information may be separated into explicit information representing a pure channel status, not assuming a certain precoding process and implicit information representing a channel status assuming a certain precoding process.

The explicit information includes channel matrixes and channel covariance and the implicit information includes PMI (precoding matrix index), CQI (channel quality indicator), and RI (rank indicator). The terminal may transmit a sounding signal instead of the channel status information. The base station may measure the channel status through the sounding signal.

A method of cooperated transmission is joint transmission. The joint transmission is a cooperated transmission scheme in which a plurality of nodes transmits signals to the same terminal at the same time/frequency resource. For example, the IEEE 802.16m supports CL-MD (closed-loop macro diversity) and Co-MIMO (collaborative MIMO) and these two modes may belong to joint transmission.

in the two modes, the terminal feeds back CPMI (concatenating PMI) and CQI for connecting the PMI with the PMI for each node. Here, the CPMI is information used for forming one precoding matrix by connecting two or more different precoding matrixes. Each precoding matrix in the code book is configured so that the phase of a coefficient corresponding to the first antenna is 0 (i.e., so that only a real number component exists). Accordingly, in order to connect two or more different precoding matrixes, it is needed to correct differences in phase between first components of respective precoding matrixes. For such purpose, information called CPMI is used. For example, in the IEEE 802.16m, three bits may be allocated to the CPMI to indicate one of eight phases ($2\pi*(n/8)$, $n=0, \ldots, 7$).

Conventionally, in the cooperated transmission in the multi-cell system, the base station indicates a specific band to the terminal and the terminal feeds back to one PMI and one CPMI to each cooperating base station for the specific band. At this time, one PMI and one CPMI are for the whole of the specific band.

If the terminal feeds back the PMI and CPMI obtained for each subband for the specific band, not the PMI and CPMI for the entire specific band, to the base station, gain obtained by the cooperated transmission may be increased. Nonetheless, the reason why, as described above, the PMI and CPMI for the entire specific band are fed back is that feeding back the PMI and CPMI for each subband may increase the amount of fed-back information and performance is not enhanced a lot relative to the increased fed-back information. Why the enhancement in performance is not that high is because the conventional cooperated transmission first considers inter-base station cooperation, and as a result, a difference between the time that the terminal measures the channel and the time that the base station receives a feedback from the terminal and actually performs cooperated transmission is increased so that the channel environment varies between the two times and the accuracy of the measured channel is lowered.

However, in the multi-node system, inter-node backhaul latency is very short. Accordingly, in the multi-node system, rather than feeding back the entire PMI and entire CPMI for a specific band indicated by the base station, feeding back the PMI and CPMI for each subband of the specific band may increase system efficiency. For example, when a specific band may be separated into M subbands, and N (N is equal to or smaller than M) PMIs and N CPMIs are fed back for each cooperating base station, the system efficiency may be increased. When N is smaller than M may be when the terminal sends out the PMI and CPMI only for the subband having a specific threshold or more of quality or when the base station sends out the PMI and CPMI only for a predetermined number of subbands. If N is large enough, there is little difference in performance as compared with when the PMI and CPMI are fed back for all the subbands.

However, such a method of feeding back the PMI and CPMI for each subband has the disadvantage that feedback overhead is increased. Accordingly, according to the present invention, a method is suggested of being able to transmit PMI and CPMI and reduce feedback overhead while exhibiting a system performance similar to the system performance obtained when PMI and CPMI are sent out for each subband.

Figure 4:
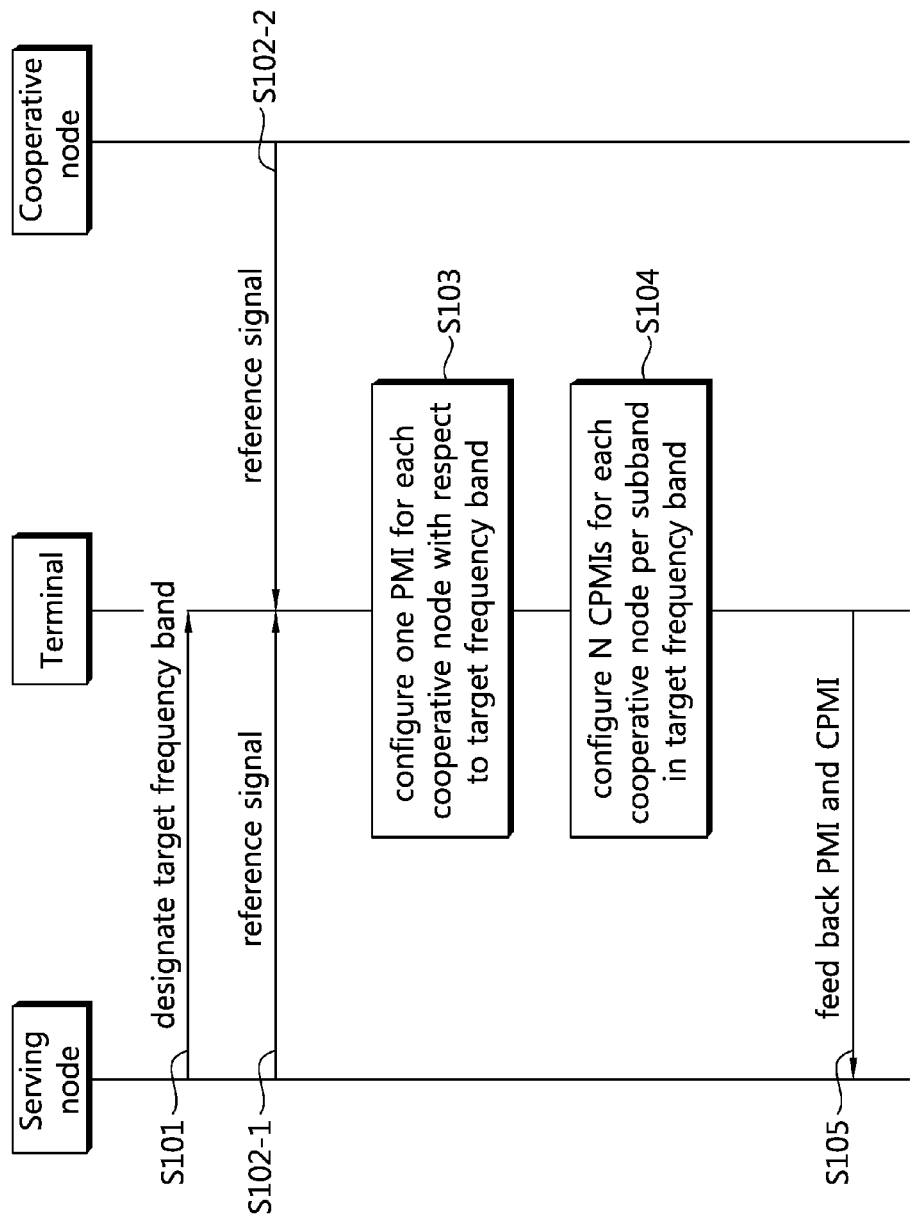
FIG. 4 illustrates a method of feeding back channel status information according to an embodiment of the present invention.

FIG. 4 illustrates a method of feeding back channel status information according to an embodiment of the present invention.

Referring to FIG. 4, the serving node designates a target frequency band to a terminal (S101). Here, the serving node may be a macro base station but is not limited thereto.

The following table shows an example of information indicating target frequency bands in the IEEE 802.16m.

TABLE 1

| parameter | description | value | control channel Information element | note |
| --- | --- | --- | --- | --- |
| ICT | Interference coordination type | 0b00: PMI limitation<br>0b01: PMI recommendation<br>0b10: CL-MD<br>0b11: Co-MIMO | Feedback Polling A-MAP IE | Indicate multiple base station MIMO mode |
| TRU | Target resource unit | 0b00: latest best subbands reported for single BS MIMO)<br>0b01: whole bandwidth<br>0b10: FFR partition 0<br>0b11: boosted FFR partition 0 | Feedback Polling A-MAP IE | Indicate resource units for measuring feedback |
| MaxUser | Maximum number of users supported in Co-MIMO | 0b00: MaxUser = 2<br>0b01: MaxUser = 3<br>0b10: MaxUser = 4<br>0b11: Reserved | Feedback Polling A-MAP IE | Maximum number of users supported in multi-user MIMO transmission using Co-MIMO |
| NIP_th_1 | NIP threshold for Single BS precoding with multi-BS Coordination trigger | 4 bits | AAI-DL-IM | |
| NIP_th_2 | NIP threshold for DL Multi-BS Joint MIMO processing trigger | 4 bits | AAI-DL-IM | |
| CINR_th | CINR threshold for single BS precoding with multi-BS coordination and multi-BS joint MIMO processing trigger | 4 bits | AAI-DL-IM | Used together with NIP_th_1 or NIP_th_2 for request for multi-BS MIMO by terminal |

In Table 1, 'TRU' denotes a target resource unit targeted for channel status information feedback. As shown in Table 1, the target frequency band of the target resource unit may be variously configured as whole bandwidth, FFR partition 0, or boosted FFR partition.

The serving node and the cooperative node transmit a reference signal to the terminal (S102-1, S102-2).

The terminal obtains one PMI per cooperative node or reference signal for the target frequency band by measuring the reference signal (S102). Here, one PMI obtained per cooperative node or reference signal may be a PMI for the entire target frequency band. Or, one PMI may be a representative value among PMIs obtained subbands obtained by splitting the target frequency band. For example, the target frequency band may be F1 and the target frequency band may be split into three subbands f1, f1, and f3. At this time, PMIs for the three subbands, respectively, may be obtained, and one of them may be determined as the representative value. As such, the reason why it is ok to obtain one PMI per cooperative node for the target frequency band is described below.

The terminal obtains N CPMIs for each cooperative node per subband in the target frequency band (S103). N may be the total number of the subbands in the target frequency band. Or, N may be smaller than the total number of the subbands in the target frequency band. In such case, CPMI may be sent out only for N subbands selected by the terminal among all the subbands in the target frequency band or the base station may designate N subbands to feed back the CPMI among all the subbands in the target frequency band to the terminal.

In another method, all the subbands in the target frequency band may is be bundled into N subband groups, and CPMI for each subband group may be fed back. At this time, each subband group may include P subbands, where P may be fixed as a specific value, may be specified depending on the system bandwidth, or may be known to the terminal by the base station through physical layer or higher layer control information.

The terminal feeds back one PMI and N CPMIs per cooperative node as obtained in the above-described process to the serving node (S104).

The method described above in connection with FIG. 4 may apply to, e.g., the case where the cooperative node is a node having low transmission power, for example, a low-power RRH or picocell/femtocell base station. In case the node having low transmission power is the cooperative node, the distance between the terminal and the cooperative node may be highly likely to be short. Further, there is a high chance of the channel environment being LoS (line of sight). In the LoS environment, it is highly likely that there are not many scattered particles and the delay spread is not very large. Accordingly, the channel between the cooperative node and the terminal has a high chance of exhibiting a frequency flat characteristic.

In such environment, the PMI per subband is highly likely to be substantially the same, so that feeding back a representative PMI rather than feeding back the PMI for each subband does not have a significant influence on the performance. Accordingly, the terminal feeds back only one PMI for the entire target frequency band for each cooperative node. As a consequence, the feedback overhead of the terminal is reduced.

However, even in the LoS environment, the CPMI does not evenly appear over the entire target frequency band because there might be a difference in the time of arrival between signals transmitted from the cooperative nodes. Accordingly, there may be per-frequency phase differences in channels between each cooperative node and the terminal. This is the same in principle as if frequency selectivity occurs due to multiple paths. Further, in case the serving node is a macro base station having high transmission power, no LoS environment may apply between the macro base station and the terminal. Accordingly, the terminal feeds back N CPMIs for N subbands.

Although in FIG. 4 the serving node, in step S101, designates a target frequency band to the terminal, this process may be omitted. In such case, the target frequency band of the terminal may be the entire system band. Then, the terminal obtains one PMI for each cooperative node for the entire system band in step S103 and constitutes N CPMIs for each cooperative node per subband in the entire system band. Further, although in step S104 of FIG. 4 N CPMIs are obtained for each cooperative node per subband in the target frequency band, this should not be construed as limiting. In some cases, the terminal may feed back parameters for obtaining CPMI, instead of CPMI. Such method is useful particularly in the environment where all nodes (reference nodes and cooperative nodes) are under the LoS environment. This is described hereinafter.

In case a joint transmission scheme is used for cooperated transmission, the terminal may perform sync with one of all the nodes participating in the cooperated transmission. The target node with which the terminal is synced is referred to as a reference node. For ease of description, assume that the reference node is node #1. Assume that a signal transmitted from node #1 arrives at the terminal at time $t_1$. It is also assumed that a signal transmitted from an ith node (node #i), a cooperative node which attends the joint transmission, arrives at the terminal at time $t_i$. In such case, if the arrival time difference (ATD) between the reference node and the cooperative node is $d_i$, $d_i = t_i - t_1$ or $d_i = t_1 - t_i$.

Assume that the channel in the frequency domain between the terminal and the ith cooperative node (node #i) is a function $H_i(f)$ of frequency f. If the channel between the terminal and node #i is under the LoS (Line of Sight) environment, $H_i(f)$ may have a constant value irrespective of the frequency. That is, $H_i(f)=c_i$ ($c_i$ is a constant). However, the valid channels for such cooperative nodes, with respect to the reference node, may have the form of $e^{j2\pi f d_i} H_i(f)$, not $H_i(f)$. That is, as much a phase difference as $2\pi f d_i$ occurs.

Figure 5:
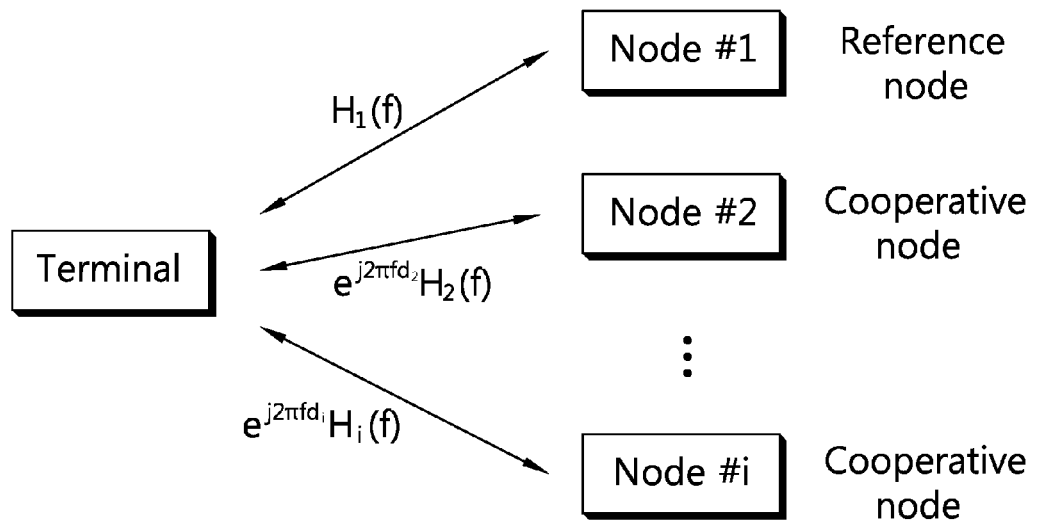
FIG. 5 illustrates a valid channel between a terminal and each node.

FIG. 5 shows a valid channel between a terminal and each node.

Referring to FIG. 5, the channel between the reference node, node #1, and the terminal is $H_1(f)$, and the channel between the cooperative node, node #i (i is a natural number that is two or more) and the terminal is $ej2^{\pi f d i} H_i(f)$ (or $e^{-j2\pi f d i} H_i(f)$). Considering that the channel $H_i(f)$ of the cooperative nodes has the form of $c_i$ ($c_i$ is a constant), the valid channels of the cooperative nodes with respect to the reference node may be represented as $c_i \cdot e^{j2\pi f d i}$. That is, it may be a channel that has a fixed amplitude and varies in phase depending on the frequency f. In such case, the CPMI value is highly likely to be determined while showing a constant difference per subband in the target frequency band. For example, the difference in CPMI value (phase correction value) between the $(n-1)^{th}$ subband and the $n^{th}$ subband may be the same as the difference in CPMI value (phase correction value) between the $n^{th}$ subband and the $(n+1)^{th}$ subband.

Further, in case the PMI for the $i^{th}$ cooperative node indicates a precoding matrix $W_i$, and the phase correction value determined by the CPMI is $\theta_i$, the precoding matrix applied to the $i^{th}$ cooperative node is $e^{j2\pi\theta i} W_i$. At this time, a comparison between the phase correction value $\theta_i$ determined by the CPMI and ATD (=$d_i$) shows there is a relationship: $\theta_i = f \cdot d_i$. Accordingly, the serving node may perform phase correction even being aware of the ATD instead of the CPMI. In light of this, the terminal may feed back, instead of N CPMIs per cooperative node, a parameter (e.g., one ATD) from which CPMIs may be generated for the subbands in the target frequency band. That is, rather than feeding back N CPMIs, the terminal may feed back one ATD only. This method enables a reduction in feedback overhead of the terminal.

Further, the terminal, rather than feeding back the ATD value itself, may feed back a type of index indicating a specific duration. For example, the ATD may be fed back in such a manner that index 1 if the ATD value is equal to and more than t1 and less than t2, index 2 if the ATD value is equal to and more than t2 and less than t3, . . . , and index i if the ATD value is equal to and more than $t_i$ and less than $t_{i+1}$ is fed back. Such index may be referred to as ATDI (arrival time difference index). As such, when the ATDI is fed back, the number of bits required may be reduced, thus decreasing feedback overhead.

Further, a value obtained by quantizing the ATD on the basis of a specific reference sampling time may be used as the ATDI. The reference sampling time (Ts) may be, e.g., Ts=1/(1500×2048) sec. Or, a phase correction value determined by the CPMI may be modeled as $e^{j(\alpha s+\beta)}$. In such case, the terminal may obtain and feed back parameters $\alpha$ and $\beta$ alone. At this time, s is an index denoting some band in the target frequency band and may be a subband index, a PRB (physical resource block) index, or a tone (subcarrier or resource element) index.

Figure 6:
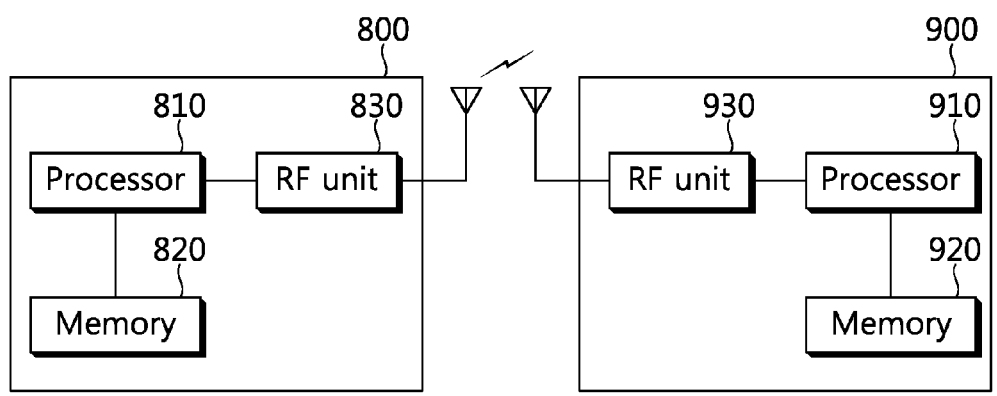
FIG. 6 is a block diagram illustrating a base station and a terminal in which an embodiment of the present invention is implemented.

FIG. 6 is a block diagram illustrating a base station and a terminal in which an embodiment of the present invention is implemented.

The base station 800 includes a processor 810, a memory 820, and an RF (Radio Frequency) unit 830. The base station 800 may control a plurality of nodes in a multi-node system. The processor 810 implements suggested functions, processes, and/or methods. The layers of the wireless interface protocol may be implemented by the processor 810. The processor 810 transmits information on a target frequency band and transmits a reference signal. Further, the processor 810 receives PMI and phase correction value (CPMI or ATDI) of each cooperative node for the target frequency band from the terminal 900 and performs cooperated transmission.

The memory 820 is connected with the processor 810 and stores various types of information for driving the processor 810. The RF unit 830 is connected with the processor 810 and transmits and/or receives radio signals.

The terminal 900 includes a processor 910, a memory 920, and an RF unit 930. The RF unit 930 is connected with the processor 910 and transmits and/or receives radio signals. The processor 910 implements suggested functions, processes, and/or methods. That is, the processor 910 receives information on a target frequency band from the base station, receives a reference signal, obtains PMI and phase correction value for the target frequency band, and feeds back them to the base station. The layers of the wireless interface protocol may be implemented by the processor 910. The memory 920 is connected with the processor 910 and stores various types of information for driving the processor 910.

The processor 810 or 910 may include an ASIC (Application-Specific Integrated Circuit), other chipsets, logic circuits and/or data processing devices. The memory 820 or 920 may include a ROM (Read-Only Memory), a RAM (Random Access Memory), a flash memory, a memory card, a storage medium and/or other storage devices. The RF unit 830 or 930 may include a baseband circuit for processing radio signals. When the embodiments are implemented in software, the above-described schemes may be embodied in modules (procedures, functions, etc.) performing the above-described functions. The modules may be stored in the memory 820 or 920 and may be executed by the processor 810 or 910. The memory 820 or 920 may be positioned in or outside the processor 810 or 910 and may be connected to the processor 810 or 910 by various known means. Although in the above-described exemplary systems, methods are described based on flowcharts including a series of steps or blocks, the present invention is not limited to the order of the steps, and some steps may be performed in a different order of other steps or simultaneously with other steps. It will be understood by one of ordinary skill that one or more steps in a flowchart may be deleted without affecting the scope of the invention.

The above-described embodiments include various aspects of examples. All possible combinations of the various aspects might not be described, but it is understood by those skilled in the art that such combinations may be possible. Accordingly, all other modifications and variations of the present invention are included in the scope of the invention as defined in the appended claims.

The invention claimed is:

1. A method of feeding back channel status information of a terminal in a multi-node system including a plurality of cooperative nodes and a base station connected to each of the plurality of cooperative nodes and able to control the plurality of cooperative nodes, the method comprising:
   obtaining a precoding matrix index (PMI) for each of the plurality of cooperative nodes over an entire target frequency band;
   obtaining a phase correction value to be applied to the PMI for each of the plurality of cooperative nodes in each subband of the target frequency band; and
   feeding back the obtained PMI and the obtained phase correction value to a serving node.

2. The method of claim 1, wherein the target frequency band is an entire system band of the multi-node system.

3. The method of claim 1, wherein the phase correction value to be applied to the PMI for each of the plurality of cooperative nodes is information used for forming one precoding matrix by connecting PMIs for two or more different cooperative nodes.

4. The method of claim 1, further comprising:
   receiving target frequency band information from the serving node,
   wherein the target frequency band information indicates the target frequency band.

5. The method of claim 4, wherein the target frequency band information indicates a partial frequency band of the entire system band as the target frequency band.

6. The method of claim 1, wherein in a case where a number of subbands in the target frequency band is N, the phase correction value to be applied to the PMI for each of the plurality of cooperative nodes is N or less, wherein N is a natural number that is two or more.

7. The method of claim 1, wherein instead of the phase correction value to be applied to the PMI for each of the plurality of cooperative nodes, a difference value between a time of receiving a signal transmitted from a reference node that is one of the plurality of cooperative nodes and a time of receiving a signal transmitted from each cooperative node is obtained and fed back.

8. The method of claim 7, wherein only one difference value is fed back for the target frequency band.

9. The method of claim 7, wherein the difference value is given as an index corresponding to each of a plurality of predetermined time durations.

10. The method of claim 1, further comprising:
    receiving a reference signal from the serving node and each of the plurality of cooperative nodes.

11. The method of claim 10, wherein the one PMI for each of the plurality of cooperative nodes and the phase correction value are obtained by measuring the reference signal.

12. A terminal, comprising:
    a radio frequency (RF) unit configured to transmit and receive a wireless signal; and
    a processor connected with the RF unit,
    wherein the processor is configured to:
    obtain a precoding matrix index (PMI) for each of a plurality of cooperative nodes in a multi-node system over an entire target frequency band,
    obtain a phase correction value to be applied to the PMI for each of the plurality of cooperative nodes in each subband of the target frequency band, and
    feed back the obtained PMI and the obtained phase correction value to a serving node.

13. The terminal of claim 12, wherein the target frequency band is an entire system band of the multi-node system.

14. The terminal of claim 12, wherein the phase correction value to be applied to the PMI for each of the plurality of cooperative nodes is information used for forming one precoding matrix by connecting PMIs for two or more different cooperative nodes.

15. The terminal of claim 12, further comprising:
    receiving target frequency band information from the serving node,
    wherein the target frequency band information indicates the target frequency band.

16. The terminal of claim 15, wherein the target frequency band information indicates a partial frequency band of the entire system band as the target frequency band.

17. The terminal of claim 12, wherein in a case where a number of subbands in the target frequency band is N, the phase correction value to be applied to the PMI for each of the plurality of cooperative nodes is N or less, wherein N is a natural number that is two or more.

18. The terminal of claim 12, wherein instead of the phase correction value to be applied to the PMI for each of the plurality of cooperative nodes, a difference value between a time of receiving a signal transmitted from a reference node that is one of the plurality of cooperative nodes and a time of receiving a signal transmitted from each cooperative node is obtained and fed back.

19. The terminal of claim 18, wherein only one difference value is fed back for the target frequency band.

20. The terminal of claim 19, wherein the difference value is given as an index corresponding to each of a plurality of predetermined time durations.

* * * * *